United States Patent [19]

Kidde

[11] 3,923,964

[45] Dec. 2, 1975

[54] PROCESS FOR THE PRODUCTION OF CALCIUM FLUORIDE FROM FLUOSILICATES AND BY-PRODUCT GYPSUM

[76] Inventor: Gustave E. Kidde, 294 California Terrace, Pasadena, Calif. 91105

[22] Filed: June 11, 1973

[21] Appl. No.: 368,670

[52] U.S. Cl. ............... 423/490; 423/339; 423/522; 423/548
[51] Int. Cl.² .......................................... C01F 11/22
[58] Field of Search ............ 423/490, 548, 522, 339

[56] References Cited
UNITED STATES PATENTS

| | | | |
|---|---|---|---|
| 3,024,086 | 3/1962 | Cines | 423/490 |
| 3,357,788 | 12/1967 | Ross | 423/490 |
| 3,755,546 | 8/1973 | Lichstein et al. | 423/339 |

FOREIGN PATENTS OR APPLICATIONS

| | | | |
|---|---|---|---|
| 189,809 | 1/1967 | U.S.S.R. | 423/490 |

*Primary Examiner*—Edward Stern
*Attorney, Agent, or Firm*—Lyon & Lyon

[57] ABSTRACT

A process for converting the fluorine contained in fluosilicate solutions to calcium fluoride comprising ammoniating the fluosilicate solution with anhydrous or aqueous ammonia, thereby quantitatively precipitating the silica; filtering, washing and recovering the silica; and further reacting the fluorides thus produced with $CaSO_4.2H_2O$ to yield high quality calcium fluoride which is recovered for sale. The filtered solution containing ammonium fluoride and free ammonia is alternatively reacted with $CaSO_4.2H_2O$ directly, or prior to such reaction, is stripped of free ammonia or is both stripped of free ammonia and heated to convert the ammonium fluoride to ammonium bifluoride.

6 Claims, 1 Drawing Figure

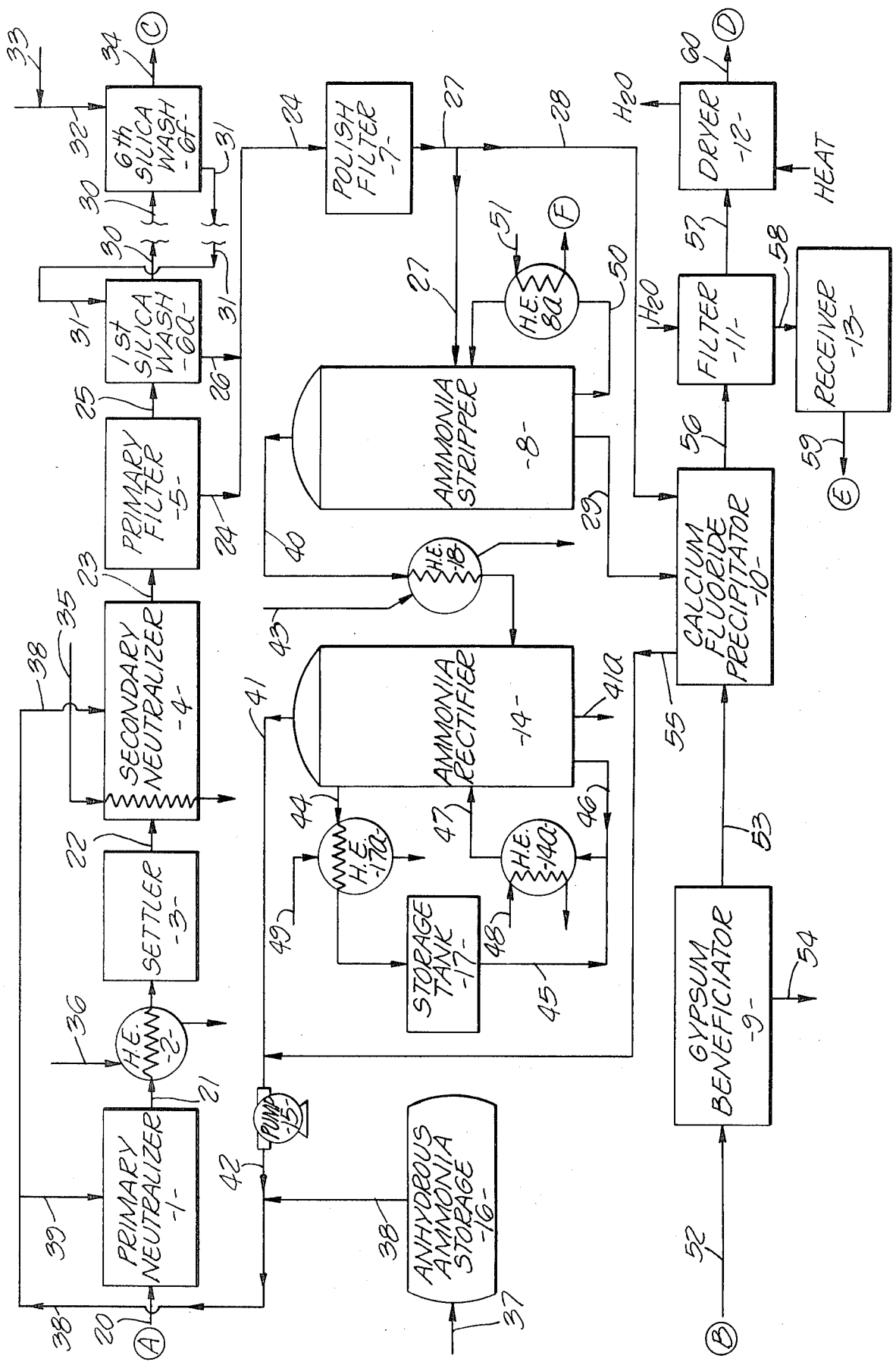

1

PROCESS FOR THE PRODUCTION OF CALCIUM FLUORIDE FROM FLUOSILICATES AND BY-PRODUCT GYPSUM

BACKGROUND OF THE INVENTION

The field of this invention relates to the conversion of fluorine, generated in the course of producing phosphatic fertilizers by the reaction of phosphate rock and sulfuric acid, to high quality calcium fluoride. Under normal operating conditions, phosphatic fertilizer plants generate large quantities of waste fluorine in the form of silicon tetrafluoride, hydrogen fluoride, or fluosilicates. These fluorine containing compounds are objectionable environmental pollutants which present considerable and costly disposal problems.

Methods of treating fluosilicic acid solutions to convert them to ammonium fluoride and ammonium bifluoride solutions are described in my application entitled "Production of Ammonium Bifluoride From Fluoride Containing Phosphoric Acid," Ser. No. 359,765, filed May 14, 1973 which is a continuation-in-part of Ser. No. 231,826, filed Mar. 6, 1972, the disclosures of which are incorporated herein by reference.

In the production of wet process phosphoric acid, another environmental pollutant, by-product gypsum ($CaSO_4 \cdot 2H_2O$), is generated in large quantities. The present invention uses these two pollutants as starting materials in a process which will produce an economically and environmentally valuable product.

Such a product is high quality calcium fluoride (97 percent + $CaF_2$) which can be sold to the chemical and metallurgical industries. Naturally occurring calcium fluoride is now obtained from fluorspar which may be in short supply in future years. This fact increases the attractiveness of providing alternative sources of this chemical.

Calcium fluoride has previously been produced from fluosilicates by ammoniating the fluosilicates to a pH of 8.8 to 9.2, separating the silica and then treating the mixed ammonium fluoride - ammonia solution with lime (CaO), hydrated lime ($Ca(OH)_2$) or calcium carbonate ($CaCO_3$) to produce an insoluble calcium fluoride and volatile ammonia which is recycled to the ammoniation step. However, this method is not economically attractive, since the present cost of the raw materials results in production costs of the calcium fluoride too high to be competitive with domestic or Mexican fluorspars.

SUMMARY OF THE INVENTION

Thus, it is an object of the present invention to provide a method for producing calcium fluoride of a high quality which is economically competitive with naturally occurring fluorspar.

It is a further object of this invention to utilize waste fluosilicate solutions and waste by-product gypsum to produce a commercially valuable calcium fluoride while eliminating or reducing certain sources of environmental pollution.

These and other objects of the invention are accomplished by first ammoniating waste fluosilicate solutions to quantitatively precipitate the silica contained therein. This may be done, for example, in a pH range of from about 8.8 to about 9.2. The precipitated silica is removed from the fluoride solution which is then, directly or after further treatment, reacted with $CaSO_4 \cdot 2H_2O$, which may be obtained from the byproduct gypsum filtercake from a wet phosphoric acid plant, to produce high quality calcium fluoride (97 percent + $CaF_2$). Preferably the silica is removed by filtration and washing with the wash solution being combined with the filtrate before further use.

The reaction temperature and time are not critical, and the reaction may be effected using the fluoride solution and the by-product gypsum at the temperatures they are delivered to the calcium fluoride reaction vessel without adjustment. For example, the reaction may be carried out at a temperature which may vary from ambient, e.g. as low as about 32° F, to about 210° F and preferably from ambient temperature to about 120° F, in a reaction time of from about 2 to about 16 hours and preferably from about 2.5 to about 4.5 hours.

In one embodiment of the invention, the fluoride solution is reacted directly with by-product gypsum. Under these conditions, it contains ammonium fluoride and free ammonia and the reaction with solid $CaSO_4 \cdot 2H_2O$ to form insoluble calcium fluoride and soluble ammonium sulphate proceeds according to the following equation:

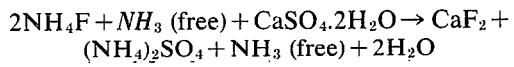

$$2NH_4F + NH_3 \text{ (free)} + CaSO_4 \cdot 2H_2O \rightarrow CaF_2 + (NH_4)_2SO_4 + NH_3 \text{ (free)} + 2H_2O$$

In this embodiment, the ammonium fluoride concentration may vary widely and may be from about 10 to about 55 percent by weight of the fluoride solution and is preferably 17 to 25 percent. Since the ammoniated fluosilicate solution may have a pH of 9.2 or higher, the reaction may proceed from a pH of about 9.2 to about 3.0. Preferably, the pH will be from about 3.8 to about 5.5 at the completion of the reaction. The calcium fluoride product is then filtered from the reaction solution, and washed and dried while the ammonium sulphate solution is returned to the phosphate plant.

In another embodiment of this invention, the free ammonia and some water are first removed from the fluoride solution in an ammonia stripper. The resulting ammonium fluoride solution is then reacted with solid by-product gypsum to form insoluble calcium fluoride and soluble ammonium sulphate according to the following reaction:

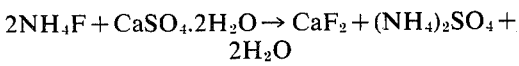

$$2NH_4F + CaSO_4 \cdot 2H_2O \rightarrow CaF_2 + (NH_4)_2SO_4 + 2H_2O$$

In this embodiment, the ammonium fluoride concentration may also vary widely and may be from about 10 to about 55 percent by weight of the fluoride solution, and is preferably from about 17 to about 30 percent. The reaction will proceed in a wide pH range with from about 6.8 to about 3.0 being typical. Preferably, the pH will be from about 3.6 to about 5.5 at the completion of the reaction. The reaction mixture is further treated as above.

In the preferred embodiment of the present invention, the free ammonia is first stripped from the fluoride solution at an elevated temperature and the ammonium fluoride concurrently converted to ammonium bifluoride by the application of heat according to the reaction:

$$2NH_4F \xrightarrow{heat} NH_4F \cdot HF + NH_3$$

The ammonium bifluoride solution thus produced is then reacted with by-product gypsum to form insoluble calcium fluoride and soluble ammonium sulphate and sulphuric acid according to the following reaction:

$$2NH_4F \cdot HF + 2CaSO_4 \cdot 2H_2O \rightarrow 2CaF_2 + (NH_4)_2SO_4 + H_2SO_4 + 2H_2O$$

In this embodiment, the ammonium bifluoride concentration may also vary widely and may be from about 8 to about 45 percent by weight of the fluoride solution, and is preferably from about 25 to about 40 percent. The reaction will proceed in a wide pH range with from about 4.0 to about 0.3 being typical. Preferably, the pH will be from about 0.3 to about 1.0 at the completion of the reaction. The reaction mixture is further treated as above.

The methods of treating waste fluosilicic acid to provide the several fluoride solutions for the various embodiments of the reaction are fully disclosed in the applications referred to above, and do not form a part of this invention. Rather, the present invention discloses novel methods for reacting fluoride solutions, such as those produced in the fluosilicic acid process, with $CaSO_4 \cdot 2H_2O$, such as by-product gypsum, to produce insoluble calcium fluoride and soluble ammonium sulphate.

The drawing is a schematic flowchart illustrating several embodiments of the present invention. No attempt has been made in the drawing to illustrate any specific details of the apparatus, as each piece of apparatus is well known in the art and may be obtained and readily operated by any person skilled in the art after having read this specification.

The flow rates and operating conditions of the following descriptions of several embodiments are not experimental results, but are empirical numbers employed to better describe the invention. However, based on experience in the art, it is believed they approximate operating conditions which might be expected in practicing the invention.

Referring to the drawing, in one embodiment, 2,170,000 lbs./operating day (o.d.) of waste fluosilicic acid A containing 260,000 lbs. of $H_2SiF_6$ at 100° F is introduced to primary neutralizer 1 through line 20. Anhydrous ammonia (74,000 lbs./o.d.) is introduced to primary neutralizer 1 through line 39. The reaction mixture leaves the primary neutralizer at 177° F through line 21 and is cooled to 100° F in heat exchanger 2 by 380 gpm of water introduced through line 36. The reaction mixture is allowed to settle in settler 3. The solution moves from the settler through line 22 to secondary neutralizer 4 where it is reacted at 140° F with 186,000 lbs./o.d. of anhydrous ammonia introduced through line 38. The reaction mixture is maintained at 140° F by 430 gpm of cooling water flowing through line 35. The ammoniated solution moves to primary silica filter 5 through line 23. The filtrate (1,708,200 lbs./o.d. containing 294,900 lbs. of ammonium fluoride, 54,600 lbs. of free ammonia and 1,358,700 lbs. of water) passes through line 24 to polish filter 7. The precipitated silica moves via 25 to silica wash 6a – 6f where it is countercurrently washed with 486,800 lbs./o.d. of water introduced through line 32 mixed with 2,400 lbs./hr. of steam introduced through line 33. The wet silica C containing 108,000 lbs./o.d. of $SiO_2$ and 546,200 lbs./o.d. of $H_2O$ is recovered via 34. The silica wash water containing 105,600 lbs./o.d. of $NH_4F$, 19,600 lbs./o.d. of $NH_3$ and 486,800 lbs./o.d. of $H_2O$ passes from silica wash 6a via lines 26 and 24 to polish filter 7.

From the polish filter, the ammoniated fluosilicate solution (2,320,200 lbs./o.d. containing 400,500 lbs. of $NH_4F$, 74,200 lbs. of $NH_3$ and 1,845,500 lbs. of $H_2O$) passes directly via lines 27 and 28 to calcium fluoride precipitator 10. Ammonia stripper 8 and ammonia rectifier 14 are not used in this embodiment. By-product gypsum filter cake B is fed to gypsum beneficiator 9 via line 52. Waste $Ca_{10}(PO_4)_6F_2$, $SiO_2$ and some $CaSO_4 \cdot 2H_2O$ are removed through line 54 to provide 931,000 lbs./o.d. of $CaSO_4 \cdot 2H_2O$ which is added to calcium fluoride precipitator 10 via line 53. Heat is injected to maintain a temperature of 170° to 190° F to volatilize free ammonia. $NH_3$ (74,200 lbs./o.d.) is evolved from the precipitator 10 which passes via line 55 to pump 15 and is returned to the ammoniation system via line 42. Slurry (3,177,000 lbs./o.d. containing 422,100 lbs. of $CaF_2$, 714,400 lbs. of $(NH_4)_2SO_4$ and 2,040,500 lbs. of $H_2O$) passes from the precipitator via line 56 to filter 11 where the solids are separated and then washed with 422,000 lbs./o.d. of water. The filtrate (2,754,900 lbs./o.d. containing 714,400 lbs. of $(NH_4)_2SO_4$ and 2,040,500 lbs. of $H_2O$) flows from filter 11 via line 58 and is collected in receiver 13 for return to the phosphate plant E via line 59. The filter cake passes via 57 to dryer 12 where 30,000,000 BTU/hr. evaporate 422,000 lbs./o.d. of $H_2O$. Product calcium fluoride D (422,100 lbs./o.d.) is recovered via 60.

In another embodiment, the solution from polish filter 7 (2,320,200 lbs./o.d. containing 400,500 lbs. of $NH_4F$, 74,200 lbs. of $NH_3$ and 1,845,500 lbs./o.d. $H_2O$ treated as above) passes via line 27 to ammonia stripper 8. Stripper 8 is operated at 180° F by adding about 46,000,000 BTU/hr. in the form of steam to heat exchanger 8a. 486,800 lbs./o.d. of the condensate F is used to supply the wash water to the silica wash through line 32. 74,200 lbs./o.d. of $NH_3$ and 945,500 lbs./o.d. of $H_2O$ pass from stripper 8 via line 40 at 180° F. Cooling water at 2,100 gpm removes 40,000,000 BTU/hr. in heat exchanger 18 and the $NH_3$ and $H_2O$ are fed to ammonia rectifier 14 at 100° F. Aqueous ammonia is stored in storage tank 17 after being cooled by heat exchanger 17a. This aqueous ammonia may be reintroduced to ammonia rectifier 14 via line 47 after being heated by heat exchanger 14a. $NH_3$ and some moisture (74,200 lbs./o.d.) is removed from rectifier 14 via line 41 and recycled to the ammoniation step by pump 15 via line 42. Water (945,500 lbs./o.d.) is removed from the rectifier via line 41a.

The ammonium fluoride solution, stripped of free ammonia, (1,300,500 lbs./o.d. containing 400,500 lbs. of $NH_4F$ and 900,000 lbs. of $H_2O$) is fed to calcium fluoride precipitator 10 via line 29. $CaSO_4 \cdot 2H_2O$ (931,000 lbs./o.d. provided as above) is fed to calcium fluoride precipitator 10 via line 53. Slurry (2,231,500 lbs./o.d. containing 714,400 lbs. of $(NH_4)_2SO_4$, 422,100 lbs. of $CaF_2$ and 1,095,000 lbs. of $H_2O$) passes from precipitator 10 via line 56 to filter 11 where the cake is washed with 422,000 lbs./o.d. of water. The filtrate (1,808,500 lbs./o.d. containing 714,400 lbs. of $(NH_4)_2SO_4$ and 1,094,100 lbs. of $H_2O$) flows from the filter via line 58 and is collected in receiver 13 for return to phosphate plant E via line 59. The filter cake passes via 57 to dryer 12 where 30,000,000 BTU/hr. removes 422,000 lbs./o.d. of $H_2O$ to yield 422,100 lbs./o.d. product $CaF_2$ D.

In the preferred embodiment of the present invention, the solution from polish filter 7 (2,320,000 lbs./o.d. containing 400,500 lbs. of $NH_4F$, 74,200 lbs. of $NH_3$, and 1,845,500 lbs. of $H_2O$ treated as above) passes via line 27 to ammonia stripper 8. Stripper 8 is operated at 240° F by adding 78,000,000 BTU/hr. in the form of steam to heat exchanger 8a. At this temperature, $NH_4F$ is converted to $NH_4F.HF$. 486,800 lbs./o.d. of the condensate F is used to supply the wash water to the silica wash via line 32. 166,200 lbs./o.d. $NH_3$ and 1,120,000 lbs./o.d. of $H_2O$ pass from the stripper via line 40 through heat exchanger 18. There 2,700 gpm of cooling water reduces the temperature to 100° F and the $NH_3$ and $H_2O$ are fed to ammonia rectifier 14. Aqueous ammonia is stored in storage tank 17 and may be reintroduced to the rectifier via line 47 after being heated by heat exchanger 14a. 1,120,000 lbs./o.d. of water is removed from the rectifier via line 14a and 166,200 lbs./o.d. $NH_3$ and some moisture is recycled to the ammoniation step by pump 15 via line 42.

The ammonium bifluoride solution, stripped of free ammonia, (1,028,000 lbs./o.d. containing 308,500 lbs. of $NH_4F.HF$ and 719,500 lbs. of $H_2O$) is fed from stripper 8 to calcium fluoride precipitator 10 via line 29. $CaSO_4.2H_2O$ (931,000 lbs./o.d. provided as above) is fed to precipitator 10 via line 53. Slurry (1,959,000 lbs./o.d. containing 357,200 lbs. of $(NH_4)_2SO_4$, 265,200 lbs. of $H_2SO_4$, 422,100 lbs. of $CaF_2$ and 914,500 lbs. of $H_2O$) passes from precipitator 10 via line 56 to filter 11 where the cake is washed with 422,000 lbs./o.d. of $H_2O$. The filtrate (1,536,900 lbs./o.d. containing 357,200 lbs. of $(NH_4)_2SO$, 265,200 lbs. of $H_2SO_4$ and 914,500 lbs. of $H_2O$) flows from the filter via line 58 and is collected in receiver 13 for return to phosphate plant E via line 59. The filter cake passes to dryer 12 via line 57 where 30,000,000 BTU/hr. removes 422,000 lbs./o.d. of $H_2O$ to yield 422,100 lbs./o.d. of calcium fluoride product D These and other embodiments of the present invention will become clear to the art skilled upon review of the above disclosure and of the following examples.

EXAMPLE 1

Reaction of $CaSO_4.2H_2O$ With a Solution Containing $NH_4F$ and Free Ammonia (pH 8.8) to Produce $CaF_2$ and $(NH_4)_2SO_4$.

The reactants were placed in a mechanically agitated, Teflon-lined pot provided with an external heat source. The ammonium bifluoride and aqua ammonia were added first to form ammonium fluoride with excess free ammonia. The reaction was carried out for 4 hours in a temperature range of 170° to 190° F. The slurry was then filtered on a Buechner vacuum filter, the cake washed with hot water and then dried at 230°F.

EXPERIMENTAL DATA

1. Original Make-up:

| | |
|---|---|
| $CaSO_4.2H_2O$ | 654.0 grams |
| $NH_4F.HF$ | 228.0 grams |
| Aqua Ammonia (29.1%) | 319.8 grams |
| $H_2O$ | 211.0 grams |
| TOTAL | 1412.8 grams |

2. Operating Data:

| TIME | TEMP. | COMMENTS |
|---|---|---|
| 0900 | 120° F | thick slurry — strong $NH_3$ odor |
| 0930 | 130° F | thick slurry — $NH_3$ evolution |
| 1000 | 170° F | thick slurry — added 200 ml $H_2O$, $NH_3$ evolution |
| 1030 | 190° F | thick slurry — added 200 ml $H_2O$, $NH_3$ evolution |
| 1100 | 188° F | thick slurry — added $H_2O$, $NH_3$ evolution |
| 1130 | 183° F | thick slurry — added $H_2O$, $NH_3$ evolution |
| 1200 | 183° F | thick slurry — added $H_2O$, $NH_3$ evolution |
| 1230 | 186° F | thick slurry — added 50 ml $H_2O$, $NH_3$ evolution |
| 1300 | 185° F | thick slurry — added $H_2O$, slight $NH_3$ evolution |
| 1330 | 183° F | thick slurry — added $H_2O$, slight $NH_3$ evolution |
| 1400 | 183° F | thick slurry — added $H_2O$, trace $NH_3$ odor |

200 ml $H_2O$ were required to rinse the pot onto the filter and it required 7 hrs., 20 minutes to remove the strong filtrate. The application of 1000 ml of wash water required 10 hrs. The pH of the slurry was 4.2. The weights were:

| | |
|---|---|
| Strong Filtrate, 993.0 grams | Wash Filtrate, 1002.9 grams |
| Wet Cake, 486.6 grams | Dry Cake, 308.3 grams |

3. Analytical Data

| | % Fluorine | % $NH_3$ | X-Ray |
|---|---|---|---|
| Dry Cake | 46.3 | nil | $CaF_2$ |
| Strong Filtrate | 0.58 | 8.68 | — |
| Wash Filtrate | 0.10 | 3.46 | — |

MATERIAL BALANCES:

1. Fluorine — In = 228 × 38/57 = 152.0 grams
   Fluorine — Out

| | | | | |
|---|---|---|---|---|
| Dry Cake | = | 308.3 × 0.463 | = | 142.7 grams |
| Strong Filtrate | = | 993.0 × 0.0058 | = | 5.8 |
| Wash Filtrate | = | 1002.9 × 0.0010 | = | 1.0 |
| TOTAL | | | = | 149.5 grams |
| % F Accounted for | | 98.4% | | |
| % F in Product | | 93.9% | | |

EXAMPLE 2

Reaction of $CaSO_4.2H_2O$ With $NH_4F$ to Produce $CaF_2$ and $(NH_4)_2SO_4$

The reactants were placed in a mechanically agitated, Teflon-lined pot provided with an external heat source. The ammonium bifluoride and aqua ammonia were added first to form ammonium fluoride with no excess ammonia. The reaction was carried out for four hours in a temperature range of 190° F to 200° F. The slurry was then filtered on a Buechner vacuum filter, the cake washed with hot water and then dried at 230°F.

EXPERIMENTAL DATA

1. Original Make-up:

| | |
|---|---|
| $CaSO_4.2H_2O$ | 487.0 grams |
| $NH_4F.HF$ | 172.0 grams |
| Aqua Ammonia (29.1%) | 175.0 grams |

EXPERIMENTAL DATA-continued

| | | |
|---|---|---|
| $H_2O$ | | 233.0 grams |
| TOTAL | | 1067.0 grams |

2. Operating Data:

| TIME | TEMP. | COMMENTS |
|---|---|---|
| 0955 | 165° F | thick slurry, added 100 ml $H_2O$ |
| 1025 | 190° F | thick slurry, added 300 ml $H_2O$ |
| 1110 | 195° F | thick slurry, added 100 ml $H_2O$ |
| 1200 | 203° F | thick slurry, added 100 ml $H_2O$ |
| 1300 | 198° F | thick slurry, added 200 ml $H_2O$ |
| 1400 | 201° F | thick slurry, added 100 ml $H_2O$ |
| 1430 | 201° F | thick slurry, added 100 ml $H_2O$ |

Commenced filtration and wash at 1430. The time to filter and wash was 19 hrs. The original slurry to the filter was very gelatinous. The pH of the slurry was 5.5. The weights were:

Strong Filtrate, 870.3 grams.  Wash Filtrate, 917.2 grams.
Wet Cake, 358.4 grams.  Dry Cake, 218.7 grams.

3. Analytical Data:

| | % Fluorine | % $NH_3$ | X-Ray |
|---|---|---|---|
| Dry Cake | 45.2 | nil | $CaF_2$ |
| Strong Filtrate | 1.5 | 6.89 | — |
| Wash Filtrate | 0.1 | 1.74 | — |

MATERIAL BALANCES:

1. Fluorine Balances:
   Fluorine — In = 172 × 38/57 = 114.7 grams
   Fluorine — Out

| | | |
   |---|---|---|
   | Dry Cake | 218.7 × 0.452 | = 98.9 grams |
   | Strong Filtrate | 870.0 × 0.015 | = 13.1 grams |
   | Wash Filtrate | 917.2 × 0.001 | = 0.9 grams |
   | TOTAL | | = 112.9 grams |

% Fluorine Accounted for = 98.4%
   % Fluorine in Product = 86.2%

2. Ammonia Balance:
   Ammonia — In = 172.0 × 17/57 + 175.0 × 0.291 = 102.2 grams
   Ammonia — Out

| | | |
   |---|---|---|
   | Strong Filtrate | 870.8 × 0.0689 | = 60.0 grams |
   | Wash Filtrate | 917.2 × 0.0174 | = 16.0 grams |
   | TOTAL | | = 76.0 grams |

% Ammonia Accounted for = 74.4%

EXAMPLE 3

Reaction of $CaSO_4 \cdot 2H_2O$ With $NH_4F \cdot HF$ to Produce $CaF_2$, $(NH_4)_2SO_4$ and $H_2SO_4$ The reactants were placed in a mechanically agitated polyethylene beaker and the reaction carried out 4 hours. The slurry was then filtered on a Buechner filter, the cake washed and dried at 225° F ± 5°.

EXPERIMENTAL DATA

1. Original Make-up:

| | |
|---|---|
| $CaSO_4 \cdot 2H_2O$ | 654.0 grams |
| $NH_4F \cdot HF$ | 228.0 grams |
| $H_2O$ | 422.0 grams |
| TOTAL | 1304.0 grams |

2. Operating Data:

The temperature during reaction varied between 71° and 74° F. Filtration and wash time was five minutes for the 1,000 ml wash. The pH of the slurry was 0.4. The weights were:

Strong Filtrate, 883.1 grams.  Wash Filtrate, 1063.3 grams
Wet Cake, 696.8 grams.  Dry Cake, 337.6 grams 3. Analytical Data:

| | % Fluorine | % $NH_3$ | X-Ray |
|---|---|---|---|
| Dry Cake | 43.0 | — | $CaF_2$ |
| Strong Filtrate | 0.8 | 5.10 | — |
| Wash Filtrate | nil | 2.12 | — |

MATERIAL BALANCES:

1. Fluorine Balance
   Fluorine — In = 228 × 38/57 = 152.0 grams
   Fluorine — Out

| | | |
   |---|---|---|
   | Dry Cake | = 337.6 × 0.43 | = 145.2 grams |
   | Strong Filtrate | = 883.1 × 0.008 | = 7.1 grams |
   | TOTAL | | = 152.3 grams |

% Fluorine Accounted for = 100.2%
   % Fluorine in Product = 95.5%

2. Ammonia Balance
   Ammonia — In = 228 × 17/57 = 68.0 grams
   Ammonia — Out

| | | |
   |---|---|---|
   | Strong Filtrate | = 883.1 × 0.051 | = 45.0 grams |
   | Wash Filtrate | = 1,063.3 × 0.0212 | = 22.5 grams |
   | TOTAL | | = 67.5 grams |

% of Ammonia Accounted for = 99.3%

I claim:

1. A process for producing high quality calcium fluoride comprising:
a first reaction step wherein a fluoride containing fluosilicate solution is reacted with ammonia to an ending pH of at least about 8.8 to quantitatively precipitate silica from a fluoride solution;
separating the precipitated silica from the fluoride solution;
subjecting said fluoride, solution to a concurrent stripping and heating step whereby free ammonia is removed from the fluoride solution and ammonium fluoride is converted to ammonium bifluoride;
a second reaction step wherein $CaSO_4 \cdot 2H_2O$ is reacted with the ammonium bifluoride to produce a high quality calcium fluoride product; and
recovering a calcium fluoride product containing at least about 97 percent calcium fluoride by weight.

2. The process of claim 1 wherein the fluoride compound is from about 25 to about 40 percent by weight of the fluoride solution; the pH at the end of the second reaction step is from about 0.3 to about 1.0; the time for the second reaction step is from about 2.5 to about 4.5 hours; and the temperature of the second reaction step is from ambient temperature to about 120° F.

3. The process of claim 1 wherein the silica is removed from the fluoride solution by filtration.

4. The process of claim 1 wherein the filtered silica is further washed and the washing solution is added to the fluoride solution prior to any further use of said fluoride solution.

5. The process of claim 1 wherein the calcium fluoride product is recovered by filtration, the filter cake thus produced is washed and dried, and the filtrate is recovered for use in a phosphate plant.

6. A process for producing high quality calcium fluoride consisting essentially of:
a first reaction step wherein a fluorine containing fluosilicate solution is reacted with ammonia in a pH range of from about 8.8 to about 9.2 to produce silica as a precipitate and a fluoride solution;
separating the precipitated silica from the fluoride solution by filtration, washing the filtered silica with water and combining the washwater with the fluoride solution;
feeding the fluoride solution to an ammonia stripper which is operated at an elevated temperature and removing from the top thereof ammonia for recycle to the first reaction step and removing from the bottom thereof a fluoride solution containing ammonium bifluoride;
a second reaction step wherein $CaSo_4 \cdot 2H_2O$, obtained from a by-product gypsum filter cake subjected to a benefication step, is reacted with the fluoride solution, in which the ammonium bifluoride is from about 8 percent to about 45 percent by weight of the fluoride solution, in a pH range beginning as high as 4.0 and ending as low as 0.3 at a temperature of from ambient temperature to about 210°F, from about 2.0 to about 16.0 hours, to produce a high quality calcium fluoride product; and
recovering a high quality calcium fluoride product containing at least about 97 percent calcium fluoride by weight from the second reaction step by filtration, washing and drying the filter cake thus produced, and further recovering the filtrate for use in a phosphate plant.

* * * * *